(12) United States Patent
Kim et al.

(10) Patent No.: US 11,415,077 B1
(45) Date of Patent: Aug. 16, 2022

(54) INSERT OF BED PLATE OF VEHICLE

(71) Applicants: Hyundai Motor Company, Seoul (KR); Kia Corporation, Seoul (KR); Korea Sintered Metal Co., Ltd., Daegu (KR)

(72) Inventors: Haksoo Kim, Seoul (KR); SeokJun Kim, Seoul (KR); Jung Kil Suk, Daegu (KR); Dong Kuk Jeong, Daegu (KR); Jin Wuk Lee, Daegu (KR)

(73) Assignees: HYUNDAI MOTOR COMPANY, Seoul (KR); KIA CORPORATION, Seoul (KR); KOREA SINTERED METAL CO., LTD., Daegu (KR)

( * ) Notice: Subject to any disclaimer, the term of this patent is extended or adjusted under 35 U.S.C. 154(b) by 0 days.

(21) Appl. No.: 17/451,923

(22) Filed: Oct. 22, 2021

(30) Foreign Application Priority Data

Feb. 9, 2021 (KR) .......................... 10-2021-0018033

(51) Int. Cl.
*F02F 7/00* (2006.01)
*F16C 35/02* (2006.01)
*F16F 15/26* (2006.01)

(52) U.S. Cl.
CPC .......... *F02F 7/0053* (2013.01); *F02F 7/0021* (2013.01); *F16C 35/02* (2013.01); *F16F 15/267* (2013.01); *F02F 2007/0056* (2013.01)

(58) Field of Classification Search
CPC .................. F02F 7/0053; F02F 7/0021; F02F 2007/0056; F16C 35/02; F16C 17/02; F16F 15/267
See application file for complete search history.

(56) References Cited

U.S. PATENT DOCUMENTS

2018/0231101 A1* 8/2018 Demeulenaere ........ F16C 17/02
2021/0131377 A1* 5/2021 Oshima ..................... F16C 9/00

FOREIGN PATENT DOCUMENTS

RU                2529563 C1 *  9/2014   ................ F16C 9/02

* cited by examiner

*Primary Examiner* — Syed O Hasan
(74) *Attorney, Agent, or Firm* — McDonnell Boehnen Hulbert & Berghoff LLP (57) ABSTRACT

An insert for a bed plate according to an embodiment of the present disclosure is coupled to a lower portion of an engine block. The insert of the bed plate includes a crankshaft seating portion disposed at a center and where a crankshaft is mounted. The insert of the bed plate also includes a ladder frame fixing portions that are disposed at opposite ends of the insert to facilitate coupling to a ladder frame. The insert of the bed plate also includes a plurality of protrusion portions that are formed on both surfaces of the insert and contact the ladder frame.

9 Claims, 10 Drawing Sheets

INSERT OF BED PLATE OF VEHICLE

CROSS-REFERENCE TO RELATED APPLICATION

This application claims priority to and the benefit of Korean Patent Application No. 10-2021-0018033 filed in the Korean Intellectual Property Office on Feb. 9, 2021, the entire contents of which are incorporated herein by reference.

TECHNICAL FIELD

The present disclosure relates to an insert of a bed plate of a vehicle. More particularly, the present disclosure relates to an insert for a bed plate of a vehicle, of which protrusions are formed in the surface of the insert.

BACKGROUND

Figure 1:
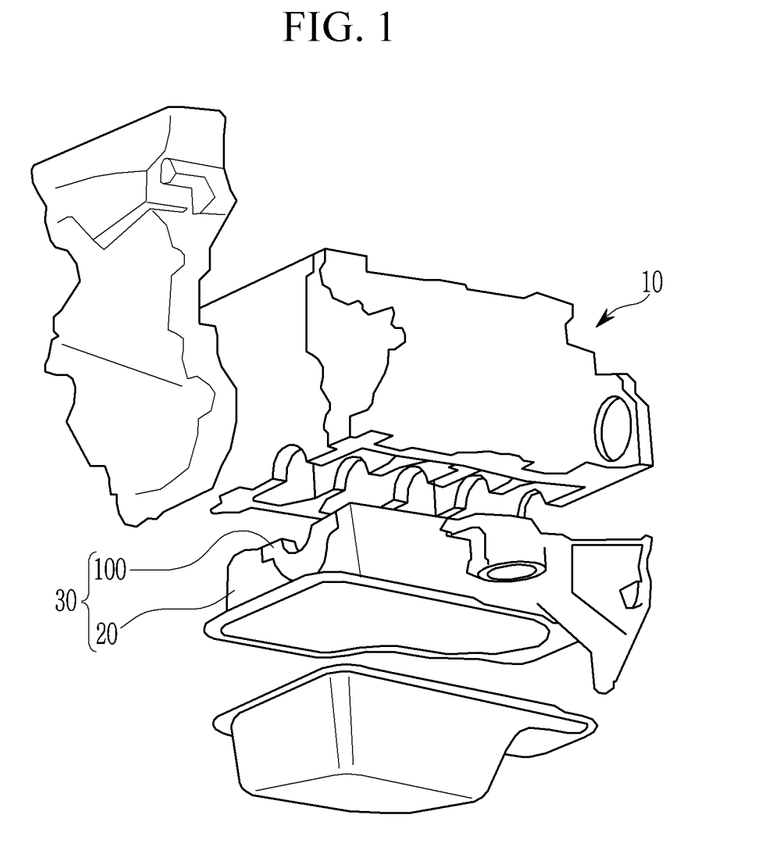
FIG. 1 schematically illustrates a coupling structure of an internal combustion engine block according to an embodiment of the present disclosure.
Figure 2:
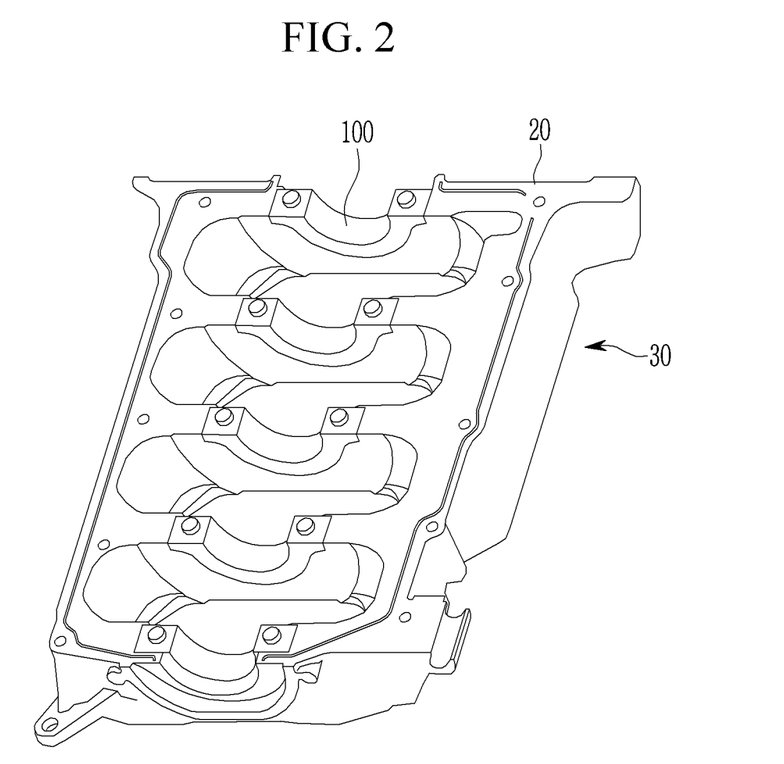
FIG. 2 schematically illustrates a bed plate according to the embodiment of the present disclosure.

In general, as shown in FIG. 1 and FIG. 2, a coupling structure of an engine block of an internal combustion engine is provided by coupling a bed plate 30 to a lower portion of an engine block 10. The bed plate 30 includes a ladder frame 20 and an insert (bearing cap, 100), and the insert 100 is mounted to the ladder frame 20. The ladder frame 20 of the bed plate 30 is mainly made of aluminum for weight reduction, and the insert 100, which is the main stress part, is integrally formed to this ladder frame 20. The insert 100 is manufactured by casting from cast iron or by inserting cast iron inserts into an aluminum die casting mold. Such a structure constitutes a strength structure that is advantageous for high rotation, and the vehicle's noise, vibration, and harshness (NVH) characteristics become excellent.

However, it is important to secure the volume of the insert 100 so that it has sufficient strength in order for the insert 100 to support the crankshaft's behavior, but the thickness of the aluminum casting portion (ladder frame) 20 is inevitably reduced in the layout. In order to make the aluminum casting portion 20 thick enough, the volume of the insert 100 must be reduced, but there is a problem of lowering the strength.

Therefore, the mechanical adhesion between the insert 100 and the aluminum casting portion 20 needs to be increased to prevent the thin aluminum casting portion 20 from cracking due to vibration, so an aluminum thermal spray coating treatment is carried out to improve durability, but there is a problem that this requires a high cost. As another alternative, a structure in which a protrusion is formed on the surface of the insert 100 can be applied, but when applying a general protrusion, the protrusion in a narrow path between a mold and the insert 100 interferes with the flow of an aluminum molten metal, causing a difficulty in the casting of the ladder frame 20.

The above information disclosed in this Background section is only for enhancement of understanding of the background of the present disclosure, and therefore it may contain information that does not form the prior art that is already known in this country to a person of ordinary skill in the art.

SUMMARY

The present disclosure is intended to solve the above problem, and the purpose of the present disclosure is to form a protrusion portion including a groove and a protrude portion formed in the groove on a surface of an insert for a bed plate of a vehicle, thereby improving flow of molten aluminum and simultaneously improving adhesion an aluminum casting layer.

An insert for a bed plate according to an embodiment of the present disclosure is coupled to a lower portion of an engine block, and includes: a crankshaft seating portion disposed at a center and where a crankshaft is mounted; ladder frame fixing portions that are disposed at opposite ends of the insert to facilitate coupling to a ladder frame; and a plurality of protrusion portions that are formed on a surface of the insert and contact the ladder frame.

Each of the plurality of protrusion portions may include a groove that is formed to retreat toward the inside of the insert by a certain distance from the surface of the insert, and a protrusion that is formed to protrude toward the outside of the insert by a certain distance in the groove.

The groove may be formed in a trapezoid shape in which a width in an inner side of the insert is smaller than a width in an outer side of the insert on a cross-section of the insert, and the protrusion may be formed in a trapezoid shape in which a width in an inner side of an insert is larger than a width in an outer side of the insert on a cross-section of the insert.

The groove and the protrusion may be formed in the shape of a circle on a plane of the insert.

A width of the groove in an inner side of the insert may be larger than a width of the protrusion in an outer side of the insert.

A depth of the groove may be lower than a height of the protrusion.

Corners of the groove and the protrusion may be rounded on a cross-section of the insert.

The insert may be formed of any one of cast iron, a sintered material, and a forging material.

The plurality of protrusion portions may be formed in a surface space between the ladder frame fixing portions at the opposite ends of the insert and the crankshaft seating portion.

The plurality of protrusion portions may be disposed side by side in a rounded shape so as to correspond to an edge shape of the crankshaft seating portion.

The plurality of protrusion portions may be disposed closer to the end face side of the insert than the outer edge of the crankshaft seating portion.

According to the embodiment of the present disclosure, a protrusion portion including a groove and a protrude portion is formed in the groove on a surface of an insert for a bed plate of a vehicle, and thus flow of molten aluminum can be improved and adhesion an aluminum casting layer can be improved.

In addition, the protrusion portion of the insert serves to fix the aluminum ladder frame when an external force is applied, thereby reducing deformation of the aluminum ladder frame due to over-vibration.

In addition, the cost can be reduced by eliminating the expensive aluminum spray coating.

DETAILED DESCRIPTION

In the following detailed description, only certain exemplary embodiments of the present disclosure have been shown and described, simply by way of illustration. The present disclosure may be implemented in various different forms and is not limited to the embodiments described herein.

In addition, in various embodiments, constituent elements having the same configuration are representatively described in an embodiment using the same reference numerals, and in other embodiments, only configurations different from the embodiment will be described.

Note that the drawings are schematic and are not drawn to scale. Relative dimensions and ratios of portions in the drawing are shown exaggerated or reduced in size for clarity and convenience in the drawing, and arbitrary dimensions are merely examples and are not limiting. In addition, the same reference numerals are used to indicate similar features for the same structure, element, or part shown in the drawings of two or more. When a part is referred to as being "above" or "on" another part, it may be directly on top of another part, or another part may be in between.

An embodiment of the present disclosure specifically represents an embodiment of the present disclosure. As a result, numerous variations of the diagram are expected. Accordingly, the embodiment is not limited to a specific form in the illustrated area, and includes, for example, a modification of the form by manufacturing.

Hereinafter, an insert structure for a bed plate of a vehicle according to an embodiment of the present disclosure will be described with reference to the accompanying drawings.

Figure 3:
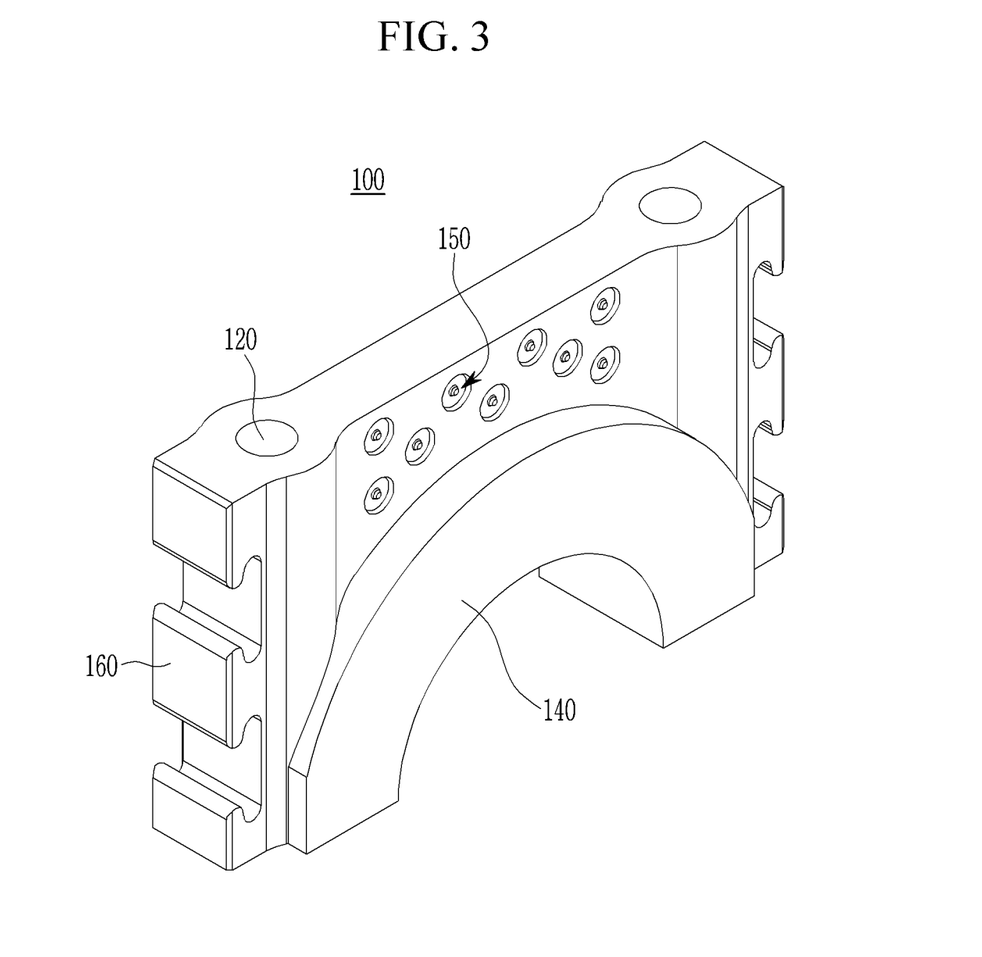
FIG. 3 is a schematic perspective view of an insert for the bed plate according to the embodiment of the present disclosure.
Figure 4:
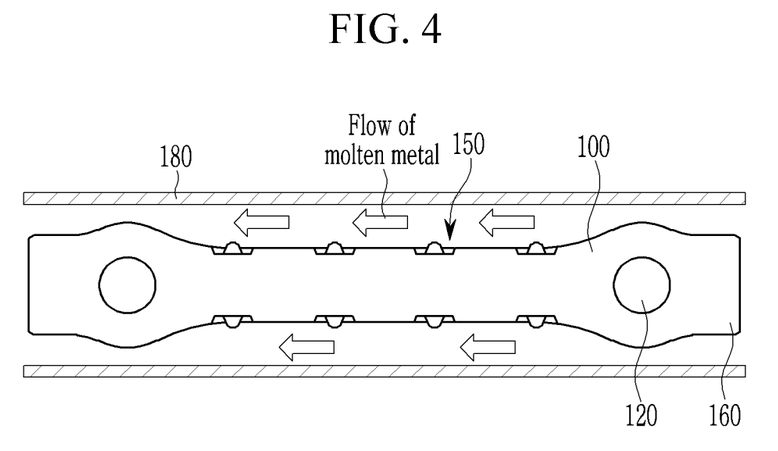
FIG. 4 is a schematic cross-sectional view of the insert for the bed plate according to the embodiment of the present disclosure.
Figure 5:
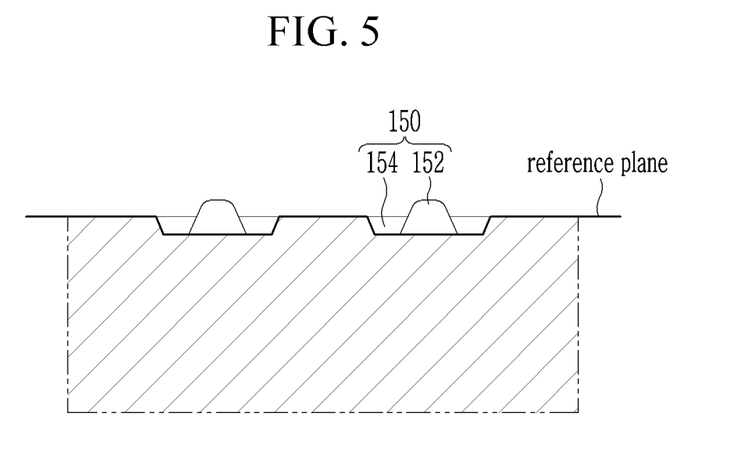
FIG. 5 is a schematic cross-sectional view of a protrusion portion according to the embodiment of the present disclosure.

FIG. 3 is a schematic perspective view of an insert for a bed plate according to an embodiment of the present disclosure, FIG. 4 is a schematic cross-sectional view of the insert for the bed plate according to the embodiment of the present disclosure, and FIG. 5 is a schematic cross-sectional view of a protrusion portion according to the embodiment of the present disclosure.

An insert 100 for a bed plate according to an embodiment of the present disclosure is a constituent element of a bed plate 30 coupled to a lower portion of an engine block 10 of a vehicle, and as shown in FIG. 1 and FIG. 2, the bed plate 30 includes a ladder frame 20 and a plurality of inserts 100, and has a structure in which the plurality of inserts 100 are mounted to a center of the ladder frame 20.

The plurality of inserts 100 are mounted in a row along the center of the ladder frame 20, a crankshaft (not shown) is seated over the plurality of inserts 100, and the crankshaft is inserted into a circular passage formed by combining the engine block 10 with the bed plate 30. A piston is coupled to the crankshaft in a vertical direction, and the piston moves reciprocally in the vertical direction according to the rotation of the crankshaft.

As shown in FIG. 3, the insert 100 includes a crankshaft seating portion 140, a ladder frame fixing portion 160, and a plurality of protrusion portions 150. The crankshaft seating portion 140 is disposed at a central portion of the insert 100, and is formed in a semicircular shape such that the crankshaft can be seated. In addition, the ladder frame fixing portion 160 is disposed at opposite ends of the insert 100 such that both ends of the insert 100 can be fitted into the ladder frame 20. In addition, the insert 100 is fitted to the ladder frame 20, and the insert 100 is bolted to the ladder frame 20 through a bolt fixing portion 120 formed through the insert 100 at both ends of the insert 100 such that the insert 100 can be more rigidly fixed in the ladder frame 20.

Meanwhile, the insert 100 may be formed of any one of cast iron, a sintered material, and a forging material.

A plurality of protrusion portions 150 may be formed at the both surfaces of the insert 100. The plurality of protrusion portions 150 may be formed in a surface space between the ladder frame fixing portions 160 at opposite ends of the insert 100 and the crankshaft seating portion 140.

The protrusion portion 150 may have a structure including a groove 154 and a protrusion 152 formed inside the groove 154. The groove 154 may be formed to retreat toward the inside of the insert 100 by a certain distance from the surface of the insert 100, that is, a reference plane, and the protrusion 152 protrudes toward the outside of the insert 100 by a predetermined distance from the surface of the insert 100 within the groove 154.

As a height of the protrusion 152 is higher, adhesion with the aluminum casting portion (aluminum ladder frame) is improved, but flowability of the aluminum molten metal between the protrusion 152 and a mold 180 deteriorates when the aluminum casting portion is manufactured. Meanwhile, as a depth of the groove 154 is thin, the flowability of the aluminum molten metal is improved, but the adhesion with the aluminum ladder frame is deteriorated. Thus, it is necessary to apply a protrusion portion structure to improve the adhesion between the insert 100 and the aluminum casting portion while also improving the flowability of the aluminum molten metal.

For this, the protrusion portion 150 according to the embodiment of the present disclosure is provided in a form that includes the protrusion 152 protruding toward the outside of the insert 100 in the groove 154 that is formed to be retreated toward the inside the insert 100.

That is, as shown in FIG. 5, in the reference plane, which is the surface of the insert 100, the groove 154 is formed in a retracted shape toward the inside of the insert 100, and the protrusion 152 is formed in a shape protruded toward the outside of the insert 100. In this case, the groove 154 and the protrusion 152 may be formed in a trapezoid shape on the cross-section of the insert 100. In addition, the groove 154 and the protrusion 152 may be formed in a circular shape on the plane of the insert 100.

Since the protrusion 152 is formed in a trapezoid conical shape with such low complexity, it is possible to prevent the fatigue characteristic of the aluminum casting from being reduced, while simultaneously improving the adhesion with the aluminum casting.

Figure 6:
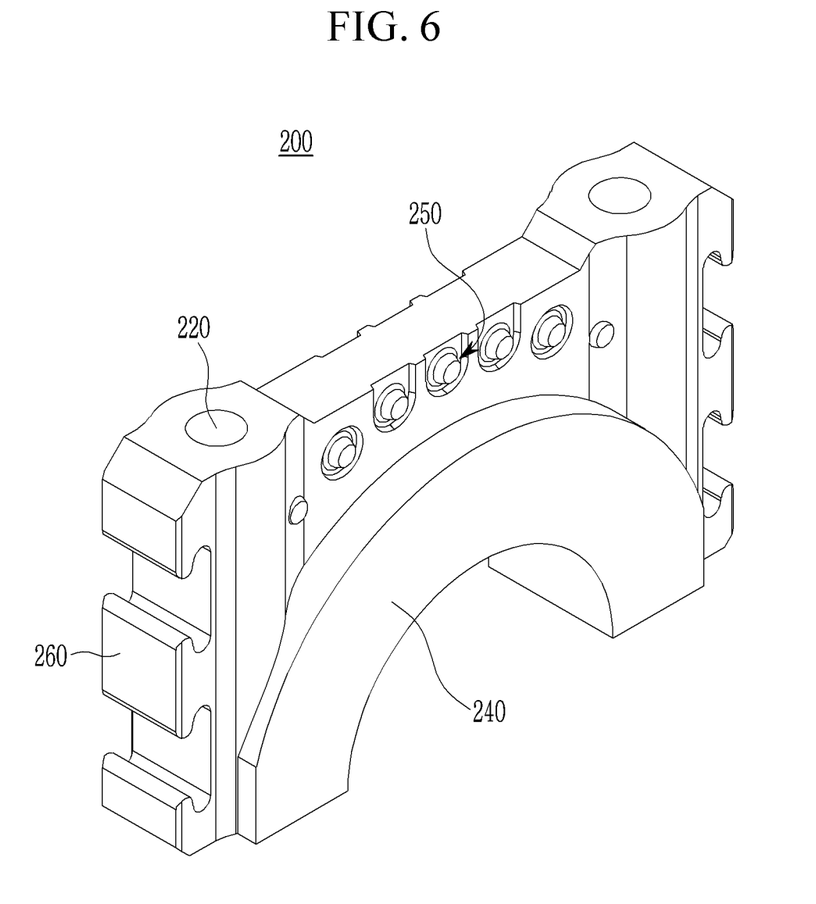
FIG. 6 is a schematic perspective view of an insert of a bed plate according to another embodiment of the present disclosure.
Figure 7:
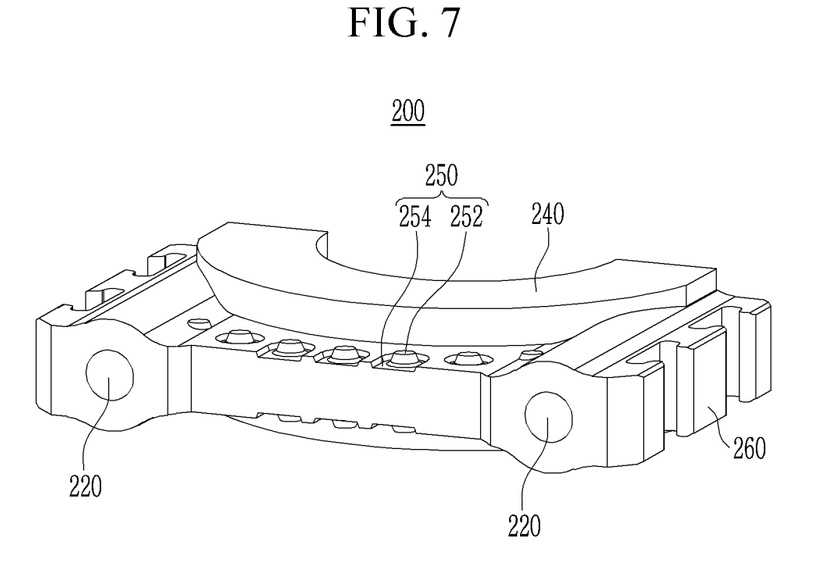
FIG. 7 is a schematic perspective view of an insert of a bed plate according to another embodiment of the present disclosure.
Figure 8:
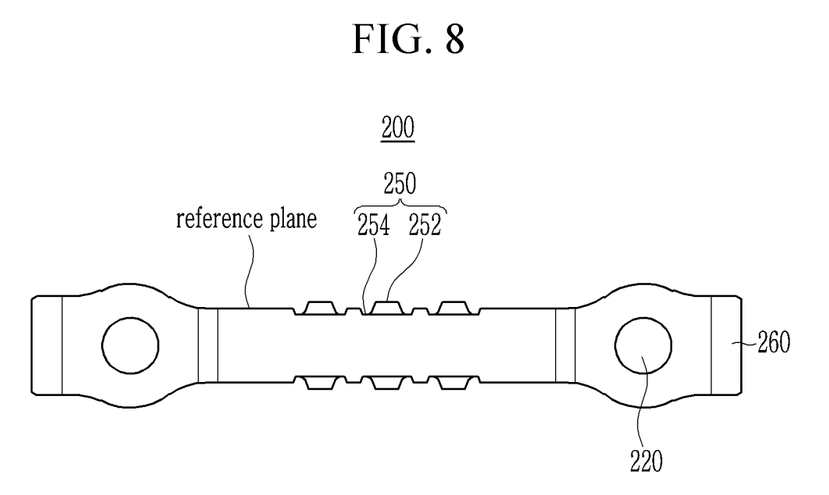
FIG. 8 is a schematic cross-sectional view of the insert of the bed plate according to the other embodiment of the present disclosure.

FIG. 6 and FIG. 7 are schematic perspective views of an insert of a bed plate according to another embodiment of the present disclosure, and FIG. 8 is a schematic cross-sectional view of the insert of the bed plate according to the other embodiment of the present disclosure.

As shown in FIG. 6 and FIG. 7, a plurality of protrusion portions 250 of an insert 200 according to another embodiment of the present disclosure may be formed in a space between ladder frame fixing portions 260 at opposite ends of the insert 200 and a crankshaft seating portion 240, and may be disposed side by side in a rounded shape so as to correspond to an edge shape of the crankshaft seating portion 240.

In addition, the plurality of protrusion portions 250 may be disposed closer to the end face side of the insert 200 than the outer edge of the crankshaft seating portion 240.

In addition, as shown in FIG. 8, a groove 254 of the protrusion portion 250 may be formed to retreat toward the inside of the insert 100 by a certain distance from a reference plane of the insert 100, and a protrusion 152 protrudes toward the outside of the insert 100 by a predetermined distance from the reference plane of the insert 100 within the groove 154.

As in the embodiment of FIG. 1 to FIG. 5, the insert 200 according to the other embodiment of the present disclosure includes the crankshaft seating portion 240 and the ladder frame fixing portion 260, both ends of the insert 100 can be fitted into the ladder frame 20 by the ladder frame fixing portion 260, and the insert 200 is bolted to the ladder frame 20 through a bolt fixing portion 120, and thus no further detailed description will be provided.

Figure 9:
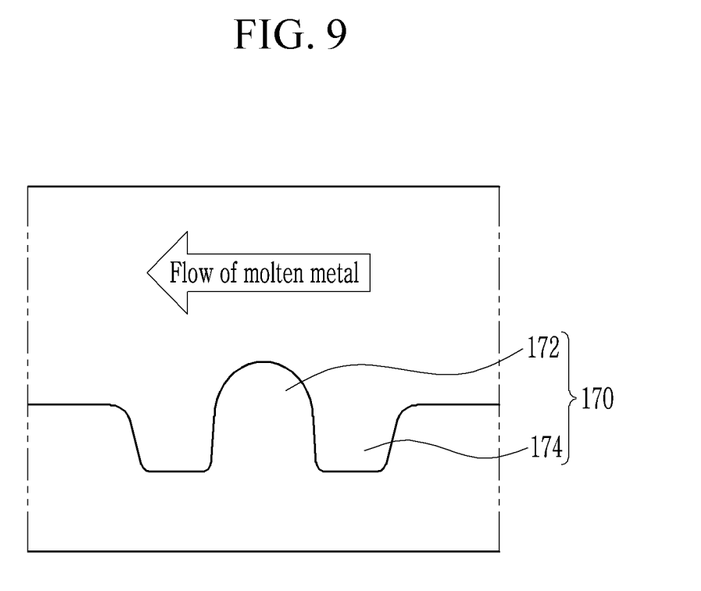
FIG. 9 is a schematic cross-sectional view of a protrusion portion according to another embodiment of the present disclosure.

FIG. 9 is a schematic cross-sectional view of a protrusion portion according to another embodiment of the present disclosure.

As shown in FIG. 9, edges of a protrusion portion 172 and a groove 174 of the protrusion portion 170 may be formed in a rounded shape in the cross-section of an insert 100. That is, due to the dimple effect generated by forming the streamlined groove 174, resistance to the protrusion portion 170 when the aluminum molten metal flows is reduced, and thus flowability of the molten metal may be improved. In addition, an edge of the end of the protrusion portion 172 to be rounded, and thus is possible to further improve the flowability of the aluminum molten metal. The shape of protrusion portion shown in FIG. 9 may be applied to the insert for the bed plate according to the embodiment of the present disclosure, described with reference to FIG. 3 to FIG. 5 and may be applied to the insert for the bed plate according to the other embodiment of the present disclosure, described with reference to FIG. 6 to FIG. 8.

Figure 10:
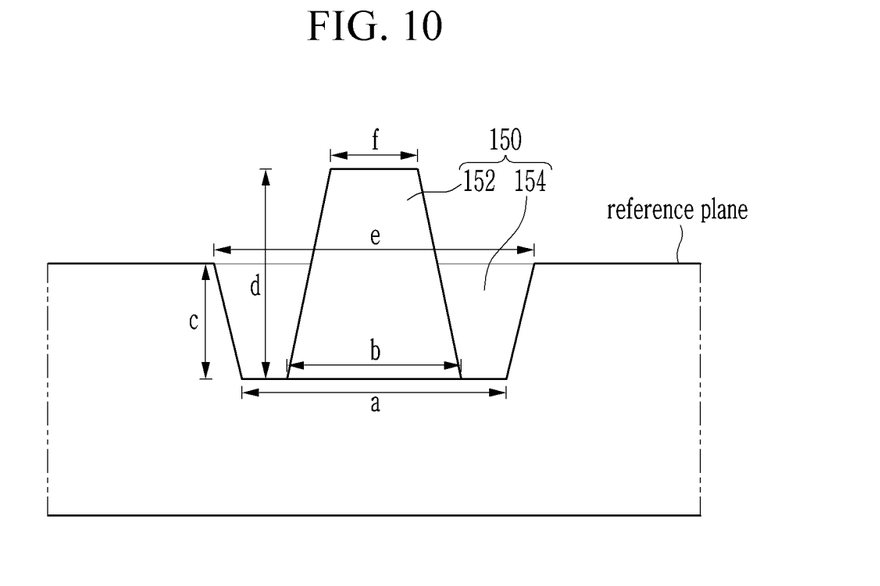
FIG. 10 is a cross-sectional view provided for description of a dimensional relationship of a protrusion portion according to an embodiment of the present disclosure.

FIG. 10 is a cross-sectional view provided for description of a dimensional relationship of a protrusion portion according to an embodiment of the present disclosure.

Referring to FIG. 10, a groove 154 of a protrusion portion 150 may be formed in a trapezoid shape in which a width a in an inner side of an insert 100 is smaller than a width e in an outer side of the insert 100 on a cross-section. In addition, the protrusion portion 150 may be formed in a trapezoid shape in which a width b in the inner side of the insert 100 is greater than a width f in the outer side of the insert 100 on a cross-section.

In addition, the width a of the groove 154 in the inner side of the insert 100 may be larger than the width b of the protrusion 152 in the inner side of the insert 100, and a depth c of the groove 154 may be smaller than a height d of the protrusion 152.

Due to the structure in which the protrusion 152 is formed in the groove 154 of the insert 100 as described above, the depth of the groove 154 can be made shallow such that the flowability of the aluminum molten metal can be improved when manufacturing the aluminum casting portion, and at the same time, the height of the protrusion 152 can be increased, thereby improving adhesion with the aluminum casting portion.

The dimensional relationship of the protrusion has been exemplarily described with the shape of the protrusion portion 150 according to the embodiment of the present disclosure, but it may be equally applied to the shape of the protrusion portion 170 of FIG. 9.

As described above, according to the embodiment of the present disclosure, a protrusion portion including a groove and a protrusion formed in the groove is formed on the insert surface, so the flow of molten metal becomes smooth during casting of the aluminum ladder frame, and adhesion with the completed aluminum ladder frame can be improved.

In addition, the protrusion portion of the insert serves to fix the aluminum ladder frame when external force is applied, thereby reducing easy deformation of the aluminum ladder frame due to over-vibration.

In addition, cost can be reduced by eliminating the expensive aluminum spray coating.

While the present disclosure has been described in connection with what is presently considered to be practical embodiments, it is to be understood that the present disclosure is not limited to the disclosed embodiments. On the contrary, it is intended to cover various modifications and equivalent arrangements included within the spirit and scope of the appended claims.

What is claimed is:

1. An insert for a bed plate, coupled to a lower portion of an engine block, comprising: a crankshaft seating portion disposed at a center and where a crankshaft is mounted; ladder frame fixing portions that are disposed at opposite ends of the insert to facilitate coupling to a ladder frame; and a plurality of protrusion portions that are formed on both surfaces of the insert and contact the ladder frame, wherein each of the plurality of protrusion portions comprises: a groove that is formed to retreat toward an inside of the insert by a certain distance from a surface of the insert, and a protrusion that is formed to protrude toward an outside of the insert by a certain distance in the groove, wherein the groove is formed in a trapezoid shape in which a width in an inner side of the insert is smaller than a width in an outer side of the insert on a cross-section of the insert, and wherein the protrusion is formed in a trapezoid shape in which a width in an inner side of an insert is larger than a width in an outer side of the insert on a cross-section of the insert.

2. The insert of the bed plate of claim 1, wherein
the groove and the protrusion are formed in the shape of a circle on a plane of the insert.

3. The insert of the bed plate of claim 1, wherein
a width of the groove in an inner side of the insert is larger than a width of the protrusion in an outer side of the insert.

4. The insert of the bed plate of claim 1, wherein a depth of the groove is lower than a height of the protrusion.

5. The insert of the bed plate of claim 1, wherein corners of the groove and the protrusion are rounded on a cross-section of the insert.

6. The insert of the bed plate of claim 1, wherein the insert is formed of any one of cast iron, a sintered material, and a forging material.

7. The insert of the bed plate of claim 1, wherein the plurality of protrusion portions are formed in a surface space between the ladder frame fixing portions at the opposite ends of the insert and the crankshaft seating portion.

8. The insert of the bed plate of claim 7, wherein the plurality of protrusion portions are disposed side by side in a rounded shape so as to correspond to an edge shape of the crankshaft seating portion.

9. The insert of the bed plate of claim 8, wherein the plurality of protrusion portions are disposed closer to the end face side of the insert than the outer edge of the crankshaft seating portion.

* * * * *